United States Patent [19]

Williams

[11] Patent Number: 4,512,522
[45] Date of Patent: Apr. 23, 1985

[54] SINGLE VERTICAL MOTION FEEDTUBE PROTECTOR AND ACTUATOR FOR A FOOD PROCESSOR

[75] Inventor: James E. Williams, Stanford, Conn.

[73] Assignee: Cuisinarts, Inc., Greenwich, Conn.

[21] Appl. No.: 542,766

[22] Filed: Oct. 17, 1983

Related U.S. Application Data

[63] Continuation-in-part of Ser. No. 500,327, Jun. 2, 1983, abandoned.

[51] Int. Cl.³ .............................................. B02C 25/00
[52] U.S. Cl. .................................. 241/37.5; 241/282.1
[58] Field of Search ............... 241/36, 37.5, 30, 92, 241/282.1, 282.2, 199.12

[56] References Cited

U.S. PATENT DOCUMENTS 4,216,917  8/1980  Clare et al. .................... 241/92 X
4,226,373 10/1980  Williams ...................... 241/282.1 X Primary Examiner—Mark Rosenbaum
Attorney, Agent, or Firm—Parmelee, Bollinger & Bramblett

[57] ABSTRACT

A feedtube protector and actuator for a food processor having a cover with a feedtube of relatively large cross-sectional area, sometimes called an "expanded" feedtube. The cover remains secured in its normal operating position on the bowl during loading of food items into the feedtube. A single vertical downward movement of the protector apparatus onto the feedtube following loading causes the actuator to depress the movable control rod for rendering the motor drive operable. Conversely, a single vertical upward movement of the protector apparatus off from the feedtube fully exposes the feed passageway while simultaneously releasing the movable control rod for rendering the motor drive inoperable. The upper end of the control rod is covered by a protective cap. In one embodiment, the actuator converts downward or upward motion of the protector apparatus into lateral extension or retraction, respectively, of a tongue-shaped cam member contacting the control rod through apertures in the sidewalls of the protective cap for respectively depressing or releasing the control rod. In another embodiment a pivoted arm mounted on the cover enters into such apertures to contact the upper end of the control rod for transmission of downward or upward motion of the protector apparatus into depression or release of the control rod. The protector apparatus includes a downwardly extending actuator leg for depressing the pivoted arm and a manually releasable latching leg.

41 Claims, 22 Drawing Figures

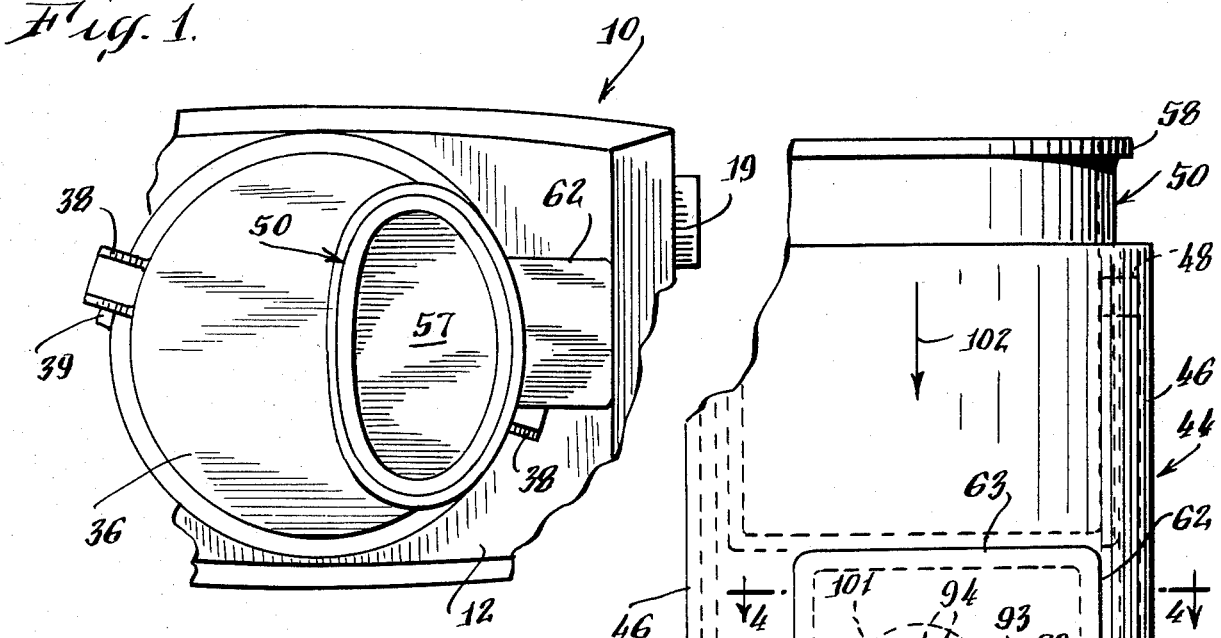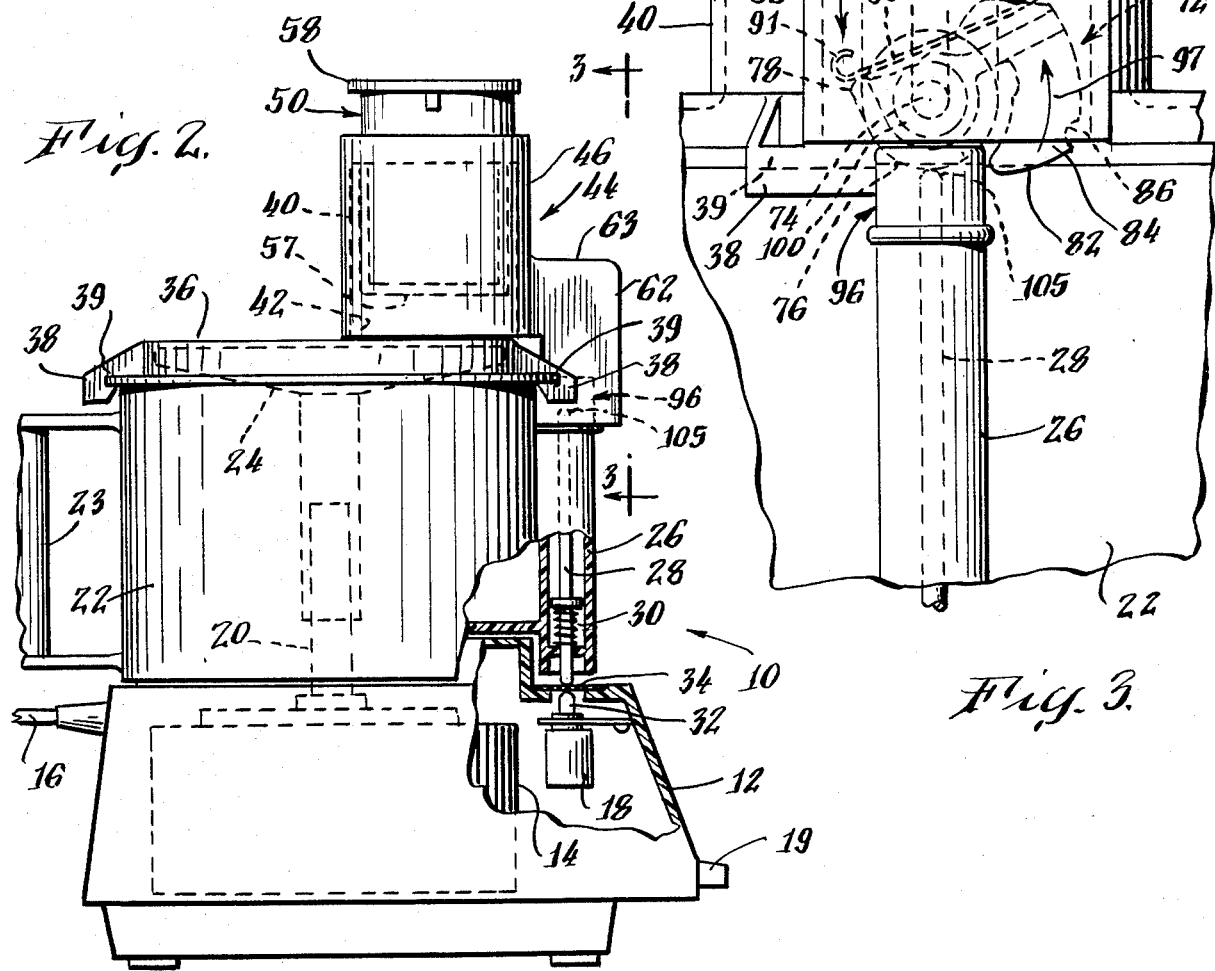

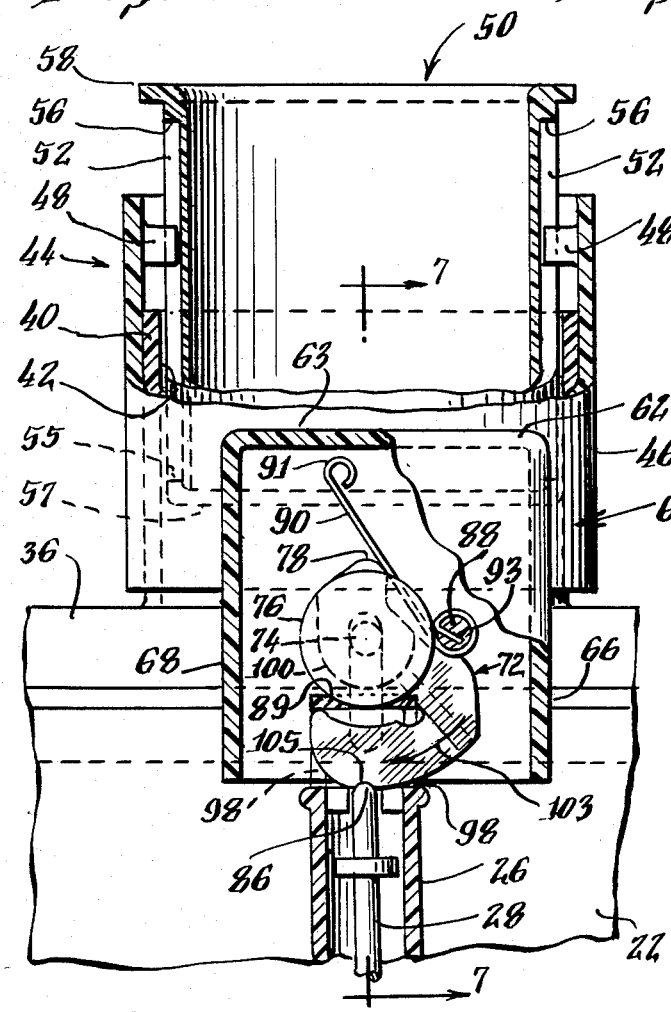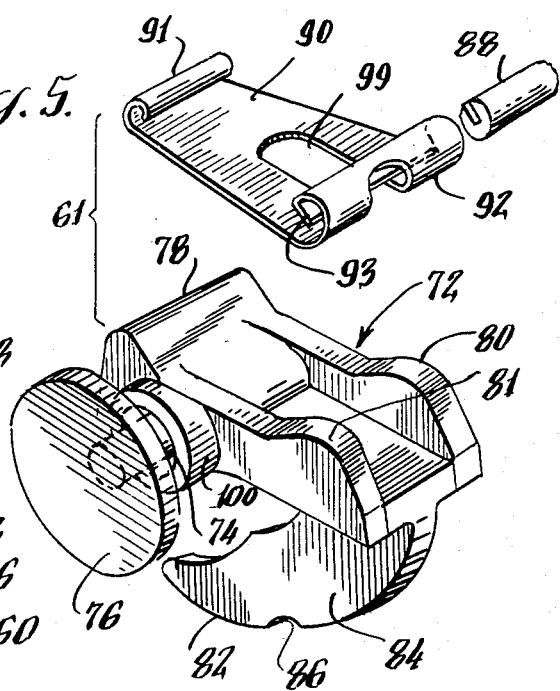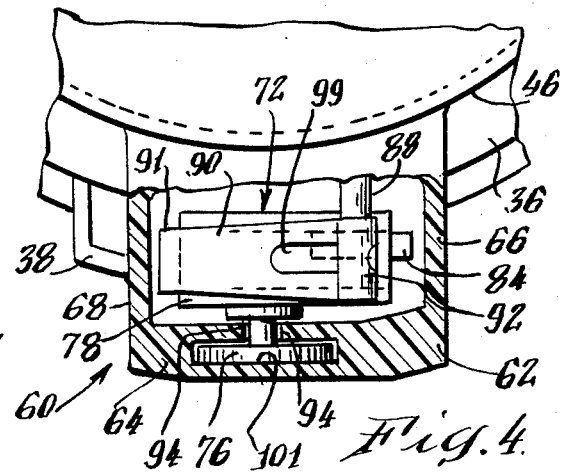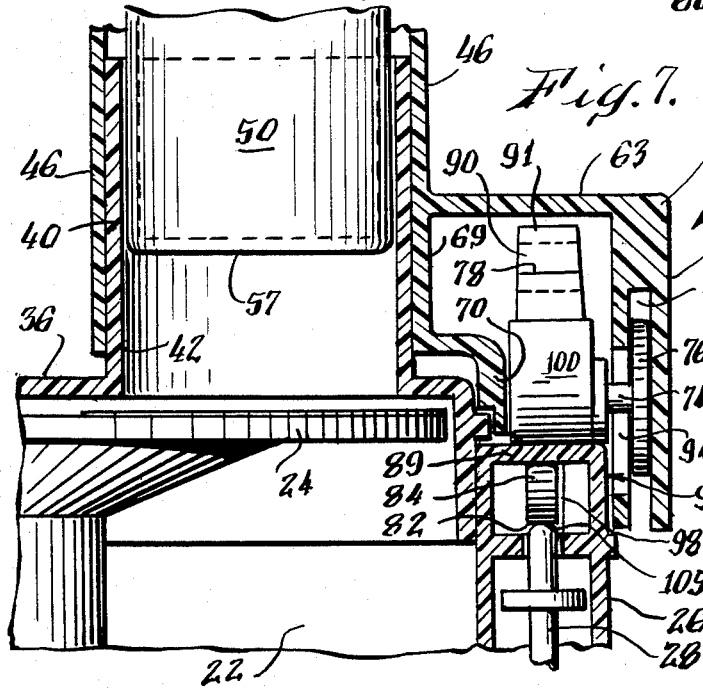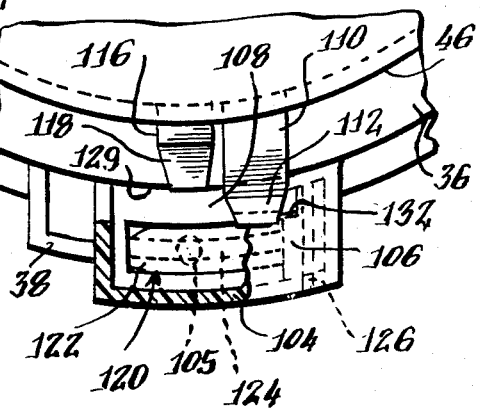

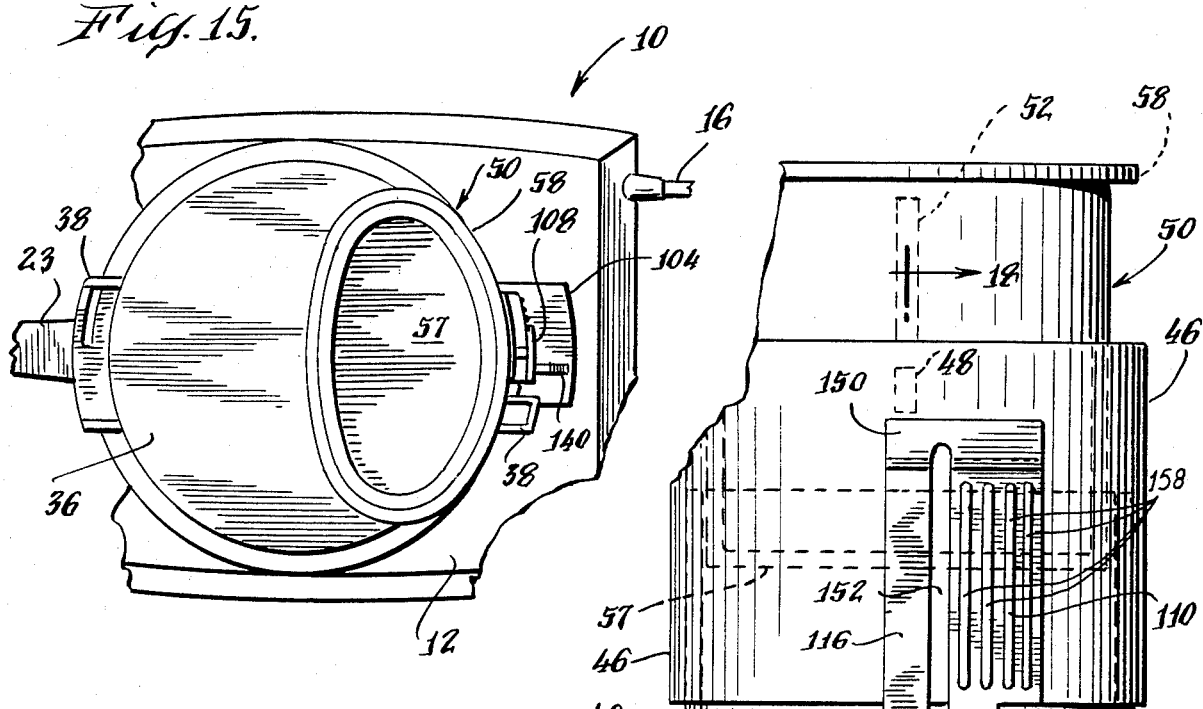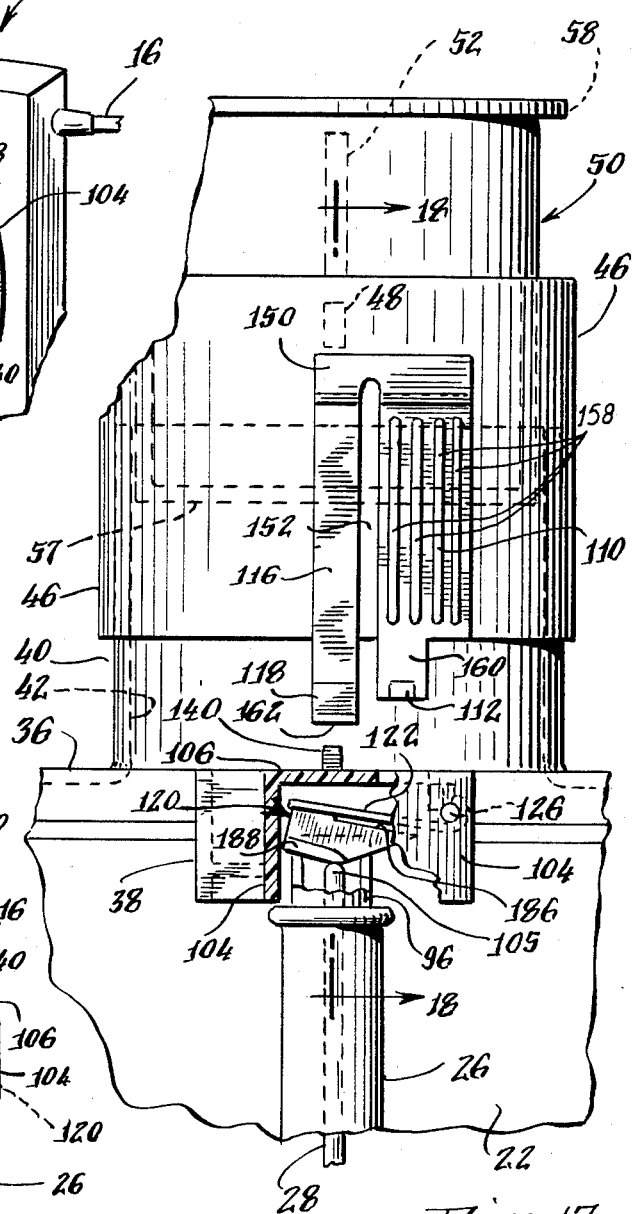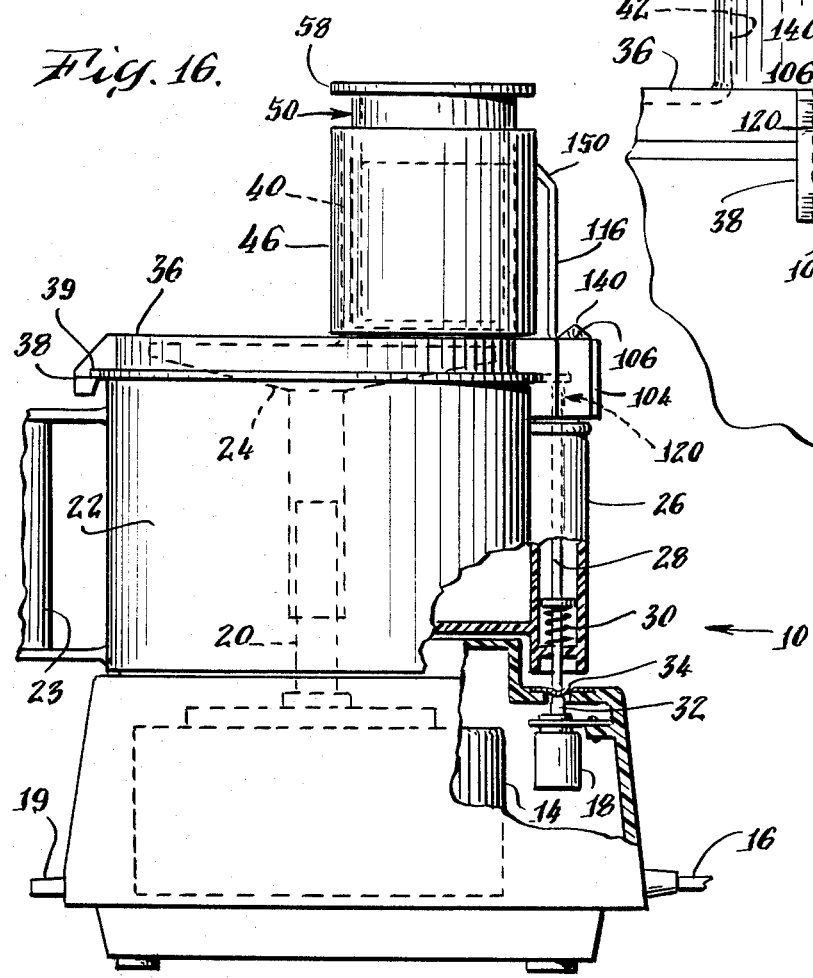

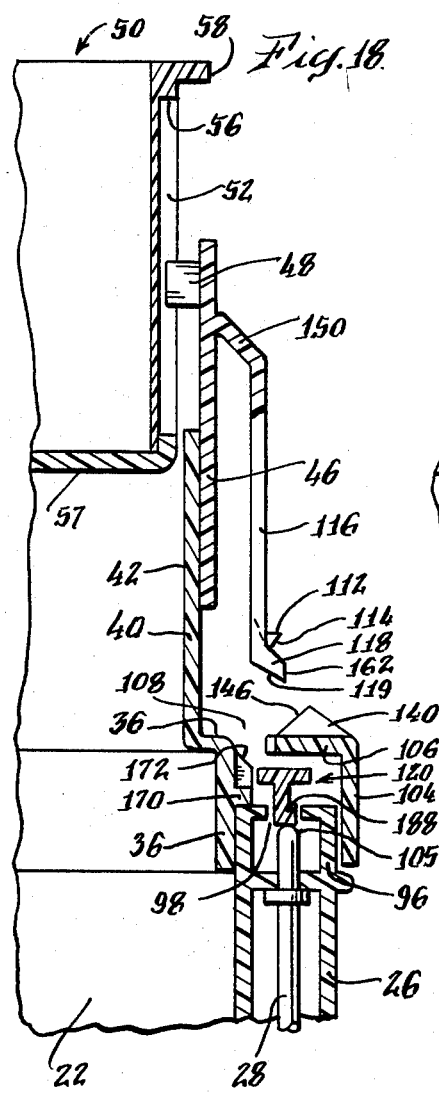

SINGLE VERTICAL MOTION FEEDTUBE PROTECTOR AND ACTUATOR FOR A FOOD PROCESSOR

RELATED APPLICATION

This application is a Continuation-In-Part of prior copending application Ser. No. 500,327, filed June 2, 1983, which has been abondoned since the filing of this application.

BACKGROUND OF THE INVENTION

This invention relates to food processors, and more particularly to feedtube protector apparatus for such machines which may be placed on and removed from a large feedtube of a food processor in a single vertical movement of the protector in order to enable or disable the operation of the food processor, permitting easy loading and at the same time protecting the feedtube from inadvertent entry of the user's hand or a foreign object.

Food processors of the type to which the present invention is applicable have a working bowl with motor-driven tool drive means in the bowl on which user-selected rotary food processing tools can be engaged to be driven for performing various food processing operations in accordance with the desires of the user. A detachable cover is secured over the top of the bowl during use which includes a feedtube having a passage that opens downwardly through the cover into the top of the bowl. Food items to be processed are placed in this feedtube and are then manually pushed down through the passage to the rotary tool in the bowl by means of a removable food pusher which is adapted to slide down in the manner of a plunger through the passage in the feedtube.

A bowl cover interlock feature is conventionally provided which requires that the cover be firmly locked on the bowl in normal operating position on the base or housing before the motor drive of the food processor will be enabled to operate. The cover which locks rotationally on the bowl is provided with a projection or actuator which causes the actuation of control means such as a switch carried by the housing only when the cover is properly locked in normal operating position on the bowl. In this arrangement, the motor drive cannot be operated before the cover is properly positioned on the bowl, but the size of the feedtube is restricted in terms of shape, cross-section and height to prevent an adult hand from being inadvertently inserted sufficiently far down in the feedtube as to come into contact with the rotating blade located in the upper portion of the working bowl.

In U.S. Pat. No. 4,226,373 a feedtube protector is provided having an outer sleeve which carries an actuator for making the machine operative only when this sleeve is properly positioned over the feedtube. The sleeve also carries a captivated, movable food pusher which is mounted for movement within the sleeve and within the passageway in the feedtube. Accordingly, the passage in the feedtube can be expanded in width to any cross-sectional area and shape which is practicable, and when the outer sleeve of the feedtube protector is properly positioned on the feedtube, the actuator extending therefrom is operatively associated with a control means in the food processor to permit operation of the motor drive.

The actuating mechanism in the aforesaid Williams patent includes a movable control rod housed in a semi-cylindrical boss on the side of the bowl. This rod is in alignment with a switch for enabling operation of the motor drive of the food processor when the switch is turned on. The outer sleeve of the feedtube protector includes an actuator which is adapted to contact the top of the control rod, thereby depressing it for turning on the switch. Thus, before the actuating mechanism in the form of the movable rod can be operated, the cover must be properly locked on the bowl in operating position with the feedtube protector positioned on the feedtube, causing the actuator to be aligned with the movable control rod for depressing the rod before the food processor can be operated.

The described expanded feedtube protector actuating apparatus in said Williams patent having multiple protective features is extremely advantageous but in some instances the present commercially available machine embodying the invention of said Williams patent may prove to be inconvenient to the user. For example, the cover is first put on the bowl and the feedtube protector is then nested on the feedtube and rotated with the cover into the locked position, so that an actuator cam on the outer sleeve of the feedtube protector depresses the control rod to enable operation of the machine. In order to reload the machine for further food processing, the feedtube protector must be rotated with the cover away from the locked position, the protector is then removed, and the feedtube is loaded, and then the protector is repositioned on the feedtube and the cover is rotated back again to its locked position for causing the actuator cam to again depress the control rod for enabling operation of the machine.

SUMMARY

It is an object of this invention to provide new and improved single vertical motion feedtube protector apparatus for facilitating the loading of a food processor while the cover remains in its locked position on the bowl of the food processor.

A further object of this invention is to provide new and improved feedtube protector apparatus which may activate or deactivate the food processor by a single downward or upward longitudinal motion, respectively, of the feedtube protector while providing feedtube protection features similar to these which have already been provided by the apparatus in said Williams patent.

Still another object of this invention is to provide new and improved feedtube protector apparatus which permits the activation or deactivation of the food processor with a single vertical motion, and yet allows the control rod used to actuate the food processor to be completely covered by a cap over the top of the rod for preventing inadvertent depression of this rod from above.

Among the advantages of the present invention are those resulting from the fact that it provides new and improved feedtube protector apparatus for a food processor having a wide feedtube passage, such apparatus being convenient, easy to operate and facilitating the loading of the feedtube while providing suitable protection for the large size passage.

A single vertical downward movement of the protector apparatus onto the feedtube following loading causes the actuating means to depress the movable control rod for rendering the motor drive operable. Also, the food pusher is aligned with the food passageway for plunger action therein for pushing food items to the rotary tool in the bowl. Conversely, a single vertical upward movement of the protector apparatus off from the feedtube fully exposes the feed passageway while simultaneously releasing the movable control rod for rendering the motor drive inoperable. The upper end of the control rod is covered over and protected by a protective cap or cover which is closed over on top. In one embodiment of the invention, the actuating means in the protector apparatus converts downward or upward motion of the protector apparatus into lateral extension or retraction motion, respectively, of a tongue-shaped cam member for entering into contact with the upper end of the control rod by moving through apertures in the sidewalls of the protective cap for respectively depressing or releasing the control rod. In another embodiment of the invention a pivoted arm mounted on the cover enters into apertures in the sidewalls of the protective cap when the cover is secured into its operating position by turning the cover on the rim of the bowl for causing this pivoted arm to come into contact with the upper end of the control rod for transmission of downward or upward motion of the protector apparatus into depression or release of the control rod.

In carrying out this invention in one illustrative embodiment thereof, the feedtube protector apparatus is provided for a food processor of the type including a housing containing an electric motor drive and control means for rendering the motor drive inoperative unless said control means is actuated. A bowl is mountable on the housing for surrounding the rotary food processing tool which is adapted to be driven by the electric motor drive. A removable cover for said bowl has a feedtube thereon forming a passageway for feeding food items through the cover into the bowl. The feedtube protector apparatus includes an outer sleeve nestable in a predetermined position around the exterior of the feedtube carrying a food pusher captivated in telescoping relation with respect to the outer sleeve so that the food pusher can be plunged longitudinally into the passageway for pushing food items toward the rotary tool in the bowl. The control means for the food processor is actuated for rendering the motor drive operative when and only when the cover is properly positioned on the bowl and the feedtube protector is nested in predetermined position around the feedtube. In accordance with the present invention the cover can remain locked in place on the workbowl during repeated loading of the wide feedtube. The feedtube protector apparatus includes actuation means on the outer sleeve of the feedtube protector operatively associated with the control means for actuating the control means by a single downward vertical movement of the outer sleeve with respect to the feedtube, thereby nesting the outer sleeve in said predetermined position around the exterior of the feedtube while at the same time actuating the control means for enabling operation of the machine. Deactivation of the control means is produced by a single upward vertical movement of the outer sleeve to remove the feedtube protector from the feedtube on the cover, thereby exposing the wide passageway in the feedtube for loading, while at the same time releasing the control means for preventing operation of the machine. Accordingly, a one-motion vertical movement of the feedtube protector to and off of the feedtube controls the operation of the food processor, thereby permitting loading of the food processor after one single motion of the protector apparatus. Moreover, the upper end of the movable control rod in the control means is covered over by a cap or cover having a closed top, thereby protecting the rod from inadvertent depression.

Among the advantages provided by the aforesaid feedtube protector apparatus are those resulting from its one convenient vertical motion after loading and for reactivation of the food processor and which prevents the operation of the machine unless the feedtube protector has been fully placed on the feedtube in the proper position. Furthermore, there is the convenient upward motion of the protective apparatus for deactivating the food processor and opening the feedtube passage.

Advantageously, the cover can remain locked on the bowl and is not a factor in the convenient activation and deactivation as accomplished in accordance with the present invention, except for the fact that the cover must be in proper position on the bowl before the present apparatus can be used to activate and deactivate the food processor. Accordingly, a convenient, one-motion feedtube protector is provided by this invention without compromising the protective features which are desired in protectors for feedtubes having wide passageways. In addition, the control rod which is depressed for activating the food processor is provided with a complete lid or cover over its upper end as contrasted with the exposed upper end of the control rod or by the slotted overhead cap provided in the prior art.

BRIEF DESCRIPTION OF THE DRAWINGS

The invention, together with further objects, advantages, features and aspects thereof will be more clearly understood from a consideration of the following description in conjunction with the accompanying drawings in which like reference numbers are used to refer to corresponding elements throughout the various views. The various Figures are drawn for clearly illustrating the principles of the invention and are not necessarily drawn to scale.

FIG. 1 is a partial top view of a food processor embodying the present invention.

FIG. 2 is a side view of the food processor of FIG. 1 shown partly broken away to illustrate the internal structure.

FIG. 3 is an enlarged, partial, front elevational view of one embodiment of the feedtube protector apparatus of the present invention. FIG. 3 is a view of FIG. 2 as seen looking at the food processor in FIG. 2 from the general position 3—3.

FIG. 4 is a top view with the cover broken away showing the actuation means of the feedtube protector apparatus of FIG. 3. FIG. 4 is a view taken generally along the line 4—4 in FIG. 3.

FIG. 5 is an enlarged, exploded view of the spring and cam actuator means shown in FIGS. 3 and 4.

FIG. 6 is a front elevational view of the feedtube protector actuating means of FIG. 3, shown partially in section, and partially broken away and illustrating such apparatus in operating position on the feedtube for actuating the control means of the food processor for enabling operation.

FIG. 7 is an elevational sectional view taken along line 7—7 of FIG. 6.

FIG. 8 is a partial, side elevational view of a food processor incorporating another embodiment of the feedtube protector and motor drive activator apparatus in accordance with the present invention.

FIG. 9 is an enlarged front elevational view of the feedtube protector activator apparatus of FIG. 8 with parts broken away in section illustrating the apparatus in deactivated position.

FIG. 10 is a top plan view of the activating means of FIG. 9 and shown partially in section.

FIG. 11 is an elevational sectional view taken along line 11—11 of FIG. 9.

FIG. 12 is a partial, elevational sectional view similar to FIG. 11 illustrating the positions of the respective components during a one-motion vertical downward movement being exerted on the sleeve of the feedtube protector which has been placed around the feedtube of the food processor.

FIG. 13 is a partial, elevational sectional view similar to FIG. 12, illustrating the final positions of the respective components of the feedtube protector apparatus when fully moved down around the feedtube in the activating position.

FIG. 14 is a partial front elevational view similar to FIG. 9, and shown partly in section illustrating the feedtube protector activator apparatus in the activating position, as is shown in FIG. 13.

FIG. 15 is a partial top view of a food processor incorporating another embodiment of the present invention.

FIG. 16 is a side view of the food processor of FIG. 15 shown partly broken away to illustrate internal structure, with the actuation components shown in activated position.

FIG. 17 is an enlarged, partial, right side view of FIG. 16 partly in section, and illustrating the food processor apparatus deactivated.

FIG. 18 is a cross-sectional view taken along line 18—18 of FIG. 17.

FIG. 19 is a cross-sectional view similar to FIG. 18 showing the apparatus just prior to activation.

FIG. 20 is a cross-sectional view similar to FIG. 19 illustrating the apparatus in an activated position.

FIG. 21 is similar to FIG. 17, except that FIG. 21 shows the apparatus activated.

FIG. 22 is an enlarged perspective view of the actuating lever which is seen in elevation in FIGS. 17 and 21.

DESCRIPTION OF THE PREFERRED EMBODIMENTS

As seen in FIGS. 1 and 2, a food processor, indicated generally by the reference numeral 10, has a base housing 12 containing a power source in the form of a relatively powerful electric motor drive 14. This drive is energized from a power cord 16 via a switch 18 having a vertical movable actuating button 32. This switch must be closed to enable operation of the motor drive. In addition, the base housing 12 includes one or more other control switches having manually movable control buttons or levers 19 for turning on and controlling the electric power to the motor drive when and only when all of the other componets of the food processor 10 are properly positioned for safe operation, as will be explained hereinafter.

A vertical drive shaft 20 extends upward from the base housing 12 which has a removable working bowl 22 mounted thereon during operation surrounding the drive shaft 20. A variety of different types of food processing tools, one of which is illustrated in dashed outline at 24, are provided. These tools are selectively mountable on the drive shaft 20 for rotation within the bowl 22 for processing food items when the motor drive 14 is operated.

A vertical semi-cylindrical boss 26 formed on the side of the bowl 22 defines a guideway in which is carried a vertically movable actuation control rod 28 which is normally urged upward by means of a spring 30. When the bowl 22 is properly positioned on the housing 12, this rod 28 is aligned with the actuating button 32 of the switch 18, being separated therefrom by means of a flexible liquid-tight membrane 34 for preventing foodstuff or liquid from entering the base housing 12. The removable working bowl 22 is provided with a convenient handle 23.

It is to be understood that the handle 23 can be mounted on the same side of the bowl as the boss 26. Also, if desired, the switch 18 and the actuation control rod 28 can be arranged to be located on the opposite side of the base housing 12 from the manual control levers 19.

The top of the bowl 22 is closed by a removable cover 36 which is engaged in locked position in its normal operating position on the bowl 22 whenever the food processor 10 is in operation. The cover 36 may be held in locked engagement on the bowl 22 by placing the cover on the rim of the bowl and manually turning the cover relative to the rim of the bowl to obtain a twist-lock effect, utilizing a plurality of circumferentially located depending lugs 38 on the cover 36 which upon rotation engage underneath a plurality of cooperating radial ledges 39 on the bowl 22 near its rim. This is only one exemplary manner of locking or latching the cover on the bowl, and it will be understood that other ways and means may be used to secure the cover in locked engagement on the working bowl during the operation of the food processor 10.

Extending upwardly from the cover 36 is a feedtube 40 defining a food passageway 42 therethrough opening downwardly through the cover 36 into the bowl 22. As will be seen in FIG. 1, the food passageway 42 is advantageously relatively large in cross sectional area compared with the bowl diameter. This passageway 42 may have any practicable shape, for example a generally rounded, elongated, arcuate or oval shape, which configuration is advantageous for receiving larger as well as elongated food items for processing, as is more fully explained in the aforesaid U.S. Pat. No. 4,266,373.

Feedtube protector apparatus, referred to generally by the reference numeral 44, is more fully seen in FIGS. 3 and 6 in which the cover 36 is shown locked in its proper operating position on the rim of the bowl 22. The feedtube protector apparatus 44 includes outer means 46 in the form of a sleeve having the same general configuration as and being slightly larger than the feedtube 40. This outer sleeve means 46 is adapted to fit down around the outside of the feedtube 40 in a close fitting but easily slidable relationship. A plurality of guide means 48 in the form of inwardly projecting elements, for example, such as tongues, lugs or splines are rigidly secured to the outer sleeve 46 near its upper end. A food pusher or plunger 50 is slidably mounted in captivated relationship on the guide means 48 for up and down movement relative to the outer sleeve. To accommodate this captivated relationship, the food pusher 50 is provided with a plurality of longitudinally extending guideways 52 which are engaged in sliding relationship with the respective guide means 48. These longitudinal guideways 52 may be in the form of molded channels, grooves, or spline-ways extending along the outside surface of the food pusher 50 or may be in the form of slots in the side of the food pusher 50.

The longitudinal guideways 52 extend down from near the top of the food pusher 50 to the bottom 57 and may include stops 55 on the bottom of the guide means 48 in order to limit the upward travel of the food pusher 50. The food pusher 50 may also include upper stops 56 as shown in FIG. 6 near its top which stop its downward travel when these stops 56 hit the fixed guide means 48. The annular flange 58 of the food pusher 50 may also act as a stop, if for example it is permitted to come into contact with the rim of the feedtube 40.

The exterior of the food pusher 50 has the general configuration of the passageway 42 in the feedtube 40 being slightly smaller such that when the outer sleeve 46 is telescoped over the exterior of the feedtube 40, the food pusher 50 becomes positioned in alignment with the feed passageway 42 for permitting plunger action therein.

The apparatus as thus far described is similar to that which is illustrated in the aforesaid Williams U.S. Pat. No. 4,226,373. In the apparatus shown in the Williams patent there is a fixed actuator rigidly secured to a flange on the outer sleeve of the feedtube protector. This fixed actuator is operatively associated with a push rod similar with the movable rod 28 only when the cover is properly positioned on the bowl and the outer sleeve is properly positioned on the feedtube. The present commercial form of this fixed actuator includes an actuator cam rigidly secured to a flange on this sleeve which is rotatable through a slotted cap which encloses the upper end of the push rod into camming engagement with this upper end for depressing this rod for enabling protection of the motor drive of the food processor. Accordingly, the feedtube protector must be properly nested on the feedtube on the cover, and then both the cover and the feedtube protector are rotated together relative to the rim of the bowl for causing the actuator cam to engage and depress the operating rod for enabling operation of the food processor. In order to reload the present commercial machine, the reverse takes place, with the cover being rotated into its unlocked position which simultaneously releases the actuator cam from the slotted cap. Then the feedtube protector is removed from the feedtube for exposing the food passageway for reloading of the machine. Food items desired to be processed are inserted therein, the feedtube protector is placed back onto the feedtube, then the cover together with the protector are again rotated back into locked position on the bowl. From this explanation it will be understood that such commercially available apparatus requires several successive operations to be performed by the user in order to load the food processor.

In the embodiment of the present invention shown in FIGS. 1 through 7, actuating means, referred to generally by the reference numeral 60, are mounted on the outer sleeve 46 of the feedtube protector 44. The actuating means 60 is brought into actuating relationship with the movable control rod 28 for actuating the food processor 10 by a single downward vertical movement of the outer sleeve 46 around the feedtube 40, when the cover is already properly secured in its normal locked position on the bowl, and the bowl is mounted in its usual operating position on the base housing 12. Likewise, the deactivation of the food processor is achieved by one single upward vertical movement of the outer sleeve, the cover remaining locked on the bowl. Thus, this single upward movement conveniently fully exposes the now wide-open passageway 42 in the feedtube 40 in readiness for inserting food items to be processed.

The activating means or assembly 60, as will best be seen in FIGS. 3–7, includes a hood-like housing 62 having a top wall 63 and a front wall 64 with side walls 66 and 68, while being open at the bottom. The back wall 69 of this hooded housing is formed by an adjacent portion of the sleeve 46, and there is an arcuate apron 70 extending downwardly from the back wall 69. As will be seen in FIGS. 3, 6 and 7, when the cover 36 is locked on the bowl 22 and the outer sleeve means 46 of the feedtube protector 44 is fully slid down onto the feedtube, the hooded housing 62 is positioned above and overlies the boss 22 carrying the movable control rod 28.

The hooded housing 62 encloses operating mechanism 61 (FIG. 5) including a swingable pivoted cam 72 attached to a cam shaft 74. This cam member 72 is mounted for translational, as well as rotational movement relative to the hooded housing 62, as will be described further below. This pivoted and movable cam 72 as seen in front elevation in FIGS. 3 and 6 generally has an overall configuration like a hook or upside-down question mark. A circular bearing disc 76 is secured to the front (outer) end of the cam shaft 74 for purposes of stabilizing this cam as will be explained. The cam member 72 includes upper cam surfaces 78 and 80, 81 and a lower cam surface 82 carried by a tongue portion 84 of this cam member. The lower cam surface 82 is provided with a detent notch 86.

A leaf spring 90 having a curled end 92 is mounted on a fixed post 88 extending forwardly from the arcuate apron 70. This curled end 92 of this leaf spring 90 closely encircles its mounting post 88, and its edge 93 fits into a groove in this post 88 for causing this spring to be biased in a counter-clockwise direction as indicated by the curved arrow 95 in FIG. 3. Consequently, this spring 90 is always pushing downwardly upon the rounded heel-like upper cam 78 of the cam member 72 for continuously urging this cam member toward swinging into its retracted, counterclockwise, deactivating position, as shown by the curved arrow 97 in FIG. 3.

In order to provide the desired flexibility in the leaf spring 90, there is an elongated opening 99 or slot extending longitudinally in the leaf spring for a significant portion of its overall length. For securely mounting this spring on its post 88, its mounted end 92 is wider than its free end 91.

As will be seen in FIGS. 3, 4, 6 and 7, the cam member 72 is mounted in the hooded housing 62 by positioning the cam shaft 74 between longitudinal guideways 94 formed in the front wall 64 of the hooded housing 62. In FIG. 3, in dashed outline, the cam member 72 is shown in its retracted deactivating position with the leaf spring 90 bearing down on the heel-like upper cam surface 78, thereby swinging the cam member 72 in the counterclockwise direction 97 for retracting the tongue 84 into the inactive position shown.

In order to protect the movable control rod 28 from accidental or inadvertent depression, the cap 96 has a completely closed-over top 89 (FIG. 6) and has a pair of aligned apertures 98 through its opposite sides. In commercially available food processors embodying the invention of the aforesaid Williams patent, there is an arcuate slot in the top of the cap which encloses the upper end of the push rod for accommodating entry of the arcuate actuator cam when the cover and the feedtube protector are rotated into operating position on the bowl. In this embodiment of the present invention, the top 89 of the cap 96 is closed, and the pair of opposed apertures 98 are adapted to receive the tongue portion 84 of the swingable cam member 72 into the interior of the protective cap 96 for depressing the operating rod 28.

In the operation of the single-motion feedtube protector embodiment illustrated in FIGS. 1-7, when the cover 36 is placed on the bowl 22 and turned into locked position on the bowl, the food items desired to be processed are conveniently placed by the user down into the wide open passageway 42 in the feedtube 40. Then the feedtube protector apparatus 44 is manually moved straight down onto the feedtube 40, with the outer sleeve means 46 sliding down around the feedtube. The hooded housing 62 overhangs the operating rod 28 covered by the cap 96 with the cam member 72 in retracted position 97 (FIG. 3) but in operative alignment with the operating rod 28. FIG. 3 illustrates the feedtube protector 44 nested on the feedtube 40 with the cover 36 secured on the bowl in its normal operating position. The sleeve 46 of the feedtube protector has not yet been fully slid down around the feedtube. In this intermediate position of the outer sleeve means 46, the tongue 84 of the cam member 72 is urged by the leaf spring 90 into an upward retracted position and is held thereby by this leaf spring. At the same time, the cam shaft 74 carrying the bearing disc 76 is in its lowermost position between the longitudinal guideways 94. The front wall 64 of the hood-like housing 62 has a vertical channel 101 (FIG. 4) which is considerably wider than the spacing between the guideways 94. The bearing disc 76 is captured in this channel 101 with sufficient clearance to allow this disc 76 to rotate and to slide vertically upwardly in this channel 101 while the shaft 74 slides up between the guideways 94, but the disc 76 cannot turn out of its own plane. In other words, this captured but rotatable and vertically slidable bearing disc 76 stabilizes the shaft 74 for maintaining this shaft horizontal and stabilizes the cam member 72 for maintaining this cam member in its properly aligned position in the housing 62.

As the user continues to move the sleeve 46, as shown by the arrow 102 around the feedtube, the annular collar 100 surrounding the cam shaft 74 comes into contact with the closed top 89 of the cap 96. As the sleeve 46 continues its downward movement 102, cam member 72 is caused to rotate in the clockwise direction 103 (FIG. 6) as the shaft 74 slides upward between the longitudinal guideways 94 and the bearing disc 76 slides upward in the channel 101. The cam member 72 is caused to rotate 103 by the closed top 89 preventing the annular collar 100 from moving down, while at the same time the fixed post 88 is moving down 102 with the outer sleeve 46. This post 88 pushes down against the cam surfaces 80, 81. The leaf spring 90 is forced upward by the upper cam surface 78 while the upper cam surfaces 80, 81 ride down under the fixed curled end 92 of the leaf spring 90.

The resulting rotary motion 103 of the cam member 72 causes the tongue 84 to enter the aperture 98 in the side of the cap 96 with the lower cam surface 82 of this tongue coming into contact with the upper end 105 (FIG. 6) of the movable control rod 28, and continues to depress the rod longitudinally downward within the boss 26 until the upper end 105 enters into the detent notch 86 on the tongue 84. At this point, the rod 28 is fully depressed for actuating the button 32 of the switch 18 for enabling operation of the motor drive 14 of the food processor 10. The motor drive activated position just described is shown in FIG. 6.

In the fully activated position (FIG. 6), the tongue 84 is effectively hooked beneath the closed top 89 of the cap 96. Therefore, when the user releases the outer sleeve 46, the spring 30 of the control rod 28 cannot push the control rod upwardly. The upper end 105 of the control rod is now pushing into the detent notch 86 while the tongue 84 is hooked immovable beneath the closed top 89. The user can now operate the food processor 10 by manipulating the levers 19 (FIG. 2) as desired. The user can feed the food items down onto the rotary tool 24 at the rate desired by pushing down on the food pusher 50.

As soon as the food items in the passageway 42 have been processed, the user may wish to reload the passageway 42. To accomplish this reloading conveniently, the outer sleeve 46 may be grasped by the hand of the user and lifted vertically. This upward motion unhooks the tongue 84 from beneath the closed top 89 and allows the leaf spring 90 to drive the upper cam surface 78 downwardly while lowering the cam shaft 76 in the guideways 94 and lowering the bearing disc 76 in the channel 101 formed in the front wall 64 of the hooded housing 62.

The large diameter disc 76 advantageously stabilizes the longitudinal and rotational movement of the cam member 72, as discussed above, thereby eliminating the need for the shaft 74 to extend inward beyond the other side of the cam member 72 which would require additional guideways and other structure.

In summary of the operation of the embodiment of FIGS. 1-7, the cover 36 is locked in operating position on the bowl 22. The sleeve 46 of the feedtube protector 44 is moved vertically downward, elevating and rotating the cam member 72 relative to the hood-like housing 62, thereby extending the tongue 84 as shown by the arrow 103 (FIG. 6) for entering into the side aperture 98 beneath the closed top 89, thereby bringing the lower cam surface 82 of the tongue 84 into engagement with the operating rod 28 depressing it and holding it in operating position in detent notch 86 of the tongue 84, with this tongue hooked immovable beneath the closed top 89. The downward movement 102 (FIG. 3) of the outer sleeve 46 of the protector apparatus 44 has been converted into a sliding and rotational movement of the cam member 72 for extending or projecting the tongue 84 into aperture 98 for engagement with the upper end 105 of the control rod.

Deactivation of the food processor 10 is achieved easily by lifting the sleeve 46 vertically upward which unhooks and retracts the tongue 84 by permitting the spring 90 to return the cam 72 to its inactivated position 97, illustrated in FIG. 3, and the feedtube passageway is now wide open available for reloading.

Figures 8, 9, 11, 12, 13, 14:
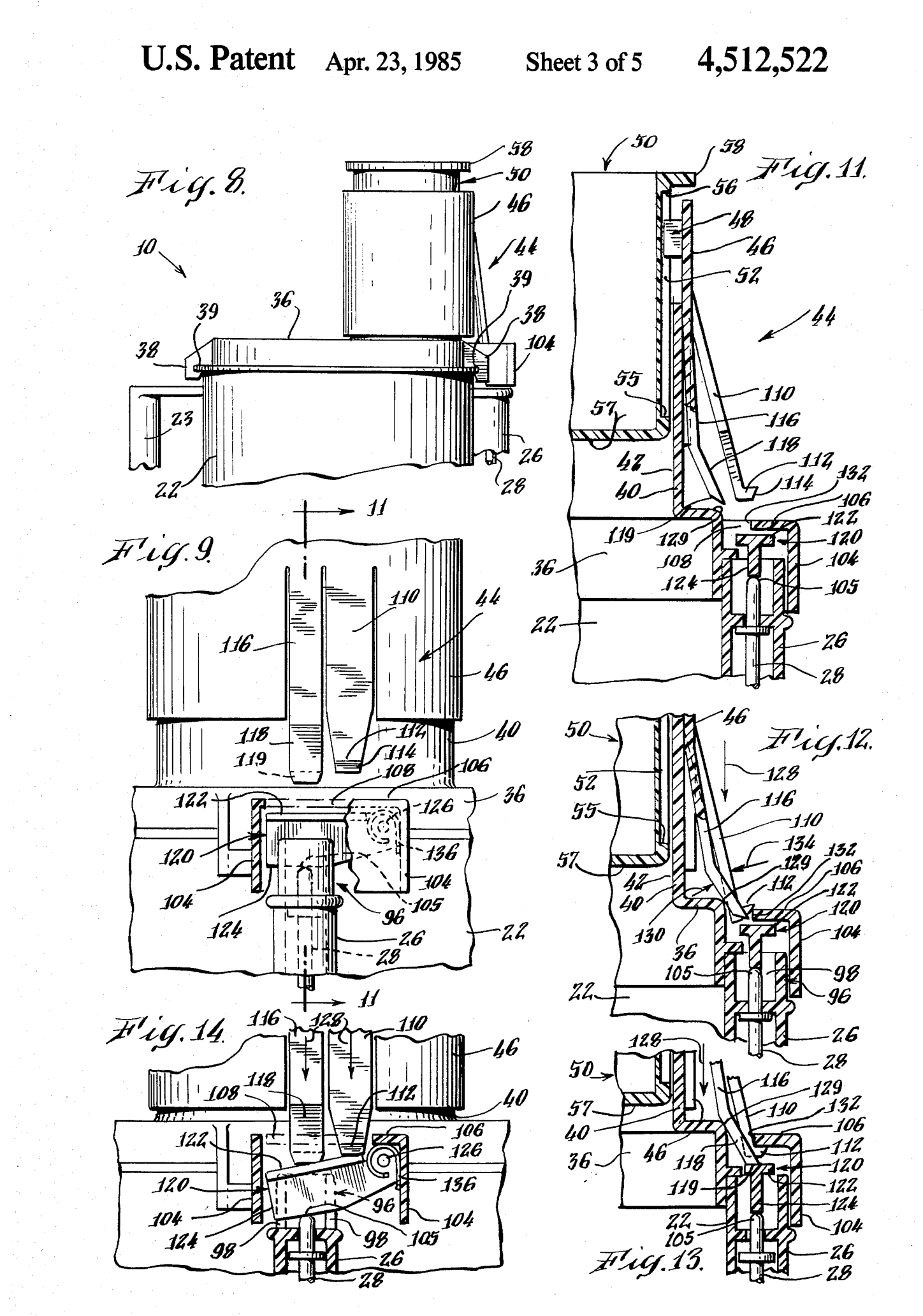

In the embodiment of the present invention, as illustrated in FIGS. 8-14, the same single-motion upward or downward vertical movement of the outer sleeve 46 of the feedtube protector is employed with the cover 36 properly positioned on the bowl. There is an actuator housing 104 mounted on the cover 36 which is adapted to overlie the slotted cap 96 protecting the top 105 of the control rod 28 in the boss 26, as is best illustrated in FIG. 9. The actuator housing 104 has a top wall 106 having an opening 108 therein which is adapted to receive a latching leg 110 as well as an actuator leg 116 extending downwardly from the outer sleeve 46 of the feedtube protector 44. The latching leg 110 has a foot 112 with a foot cam surface 114 thereon while the actuator leg 116 contains an angled foot 118 having a sole 119 thereon. (Please see FIG. 11.)

As will best be seen in FIGS. 9 and 14, the actuator housing 106 contains a pivoted arm member 120 mounted on a fixed pivot 126 within the housing 104 secured to the rim of the cover. This arm has a shelf 122 and a cam blade 124 extending downward from this shelf.

As shown in FIGS. 9 and 11, the pivoted arm member 120 in its inactivated position has the cam blade 124 extending through the slot 98 of the slotted cap 96 overlying and in operative alignment with the top 105 of the control rod 28.

FIGS. 11-13 show the operating sequence of this embodiment of the invention. In FIG. 11 the cover 36 has been turned relative to the bowl 22 into its twist-locked operating position on the bowl. This mounting of the cover onto the bowl has brought the cam blade 124 into overlying and aligned relationship with but not operatively contacting the upper end 105 of the rod 28. With a downward movement of the outer sleeve 46, illustrated by the arrow 128 in FIG. 12, the sole 119 and the angled foot 118 of the actuator leg 116 are cammed outwardly as illustrated by the arrow 130 (FIG. 12) and this angled foot 118 enters into the opening 108 in the top wall 106 of the actuator housing 104. At the same time, the foot cam surface 114 of the foot 112 of the latching leg 110 is cammed inwardly as illustrated by the arrow 134 as the foot cam surface 114 contacts an edge 132 adjacent to the opening 108 in the top wall 106.

As the downward motion continues, as illustrated by the arrow 128 in FIG. 13, the foot 112 of the latching leg 110 moves completely through the opening 108. The toe of this foot 112 engages in hooked relation beneath the top wall 106 of the housing 104, thereby latching this latching leg 110 in the housing 104 and holding the outer sleeve 46 in its fully lowered position. At the same time that the latching leg 110 is being engaged in hooked position in the housing 104, as shown in FIG. 13, the actuator leg 116 has moved down through the housing opening 108 with the sole 119 of its angled foot 118 coming into engagement with shelf 122 of the arm member 120 forcing the cam blade 124 downwardly into engagement with the top 105 of the control rod 28, thereby depressing this rod for activating the food processor. The activated position is illustrated in both FIGS. 13 and 14 respectively.

In this embodiment to deactivate the food procesor all that is necessary is for the user to grasp the sleeve 46 while pressing inwardly on the latching leg 110 for unhooking its latching foot. Then, the outer sleeve 46 is lifted vertically upward, thereby disengaging the sole of the angled foot of the actuator leg 116 from engagement with the shelf 122 for releasing the arm 120 out of operative engagement with the operating rod 28, thereby deactivating the food processor until the feedtube protector 44 is again vertically lowered on the feedtube 40.

There is a spring 136 as seen in FIGS. 9 and 14 which urges the arm member 120 upwardly for normally holding this arm member horizontal. The downward pressure 128 of the actuator leg 116 overcomes the force of this spring 136, and also overcomes the force of the spring 30 (FIG. 2) when this actuator leg swings the arm 120 downwardly as shown in FIGS. 13 and 14, respectively. The hooking of the foot 112 of the latching leg 110 beneath the edge 132 of the housing top wall 106 resists the upward force of the springs 136 and 30 until this latching leg is manually released.

Another embodiment of the invention is illustrated in FIGS. 15-22, which is similar to the embodiment illustrated in FIGS. 8-14. This embodiment also enables a single-motion downward or upward vertical movement of the outer protector sleeve 46 to activate the food processor 10 when the cover 36 is properly positioned on the bowl 22. In other words, it is very easy and convenient for the user to load the large size ("expanded") feedtube while the cover remains secured on the bowl in its normal operating position.

Throughout FIGS. 1-7, 8-14, and 15-22 corresponding reference numbers are used to indicate parts and components performing the same or similar functions. The food processor 10 shown in FIGS. 8-22 may be arranged slightly differently from what is shown in FIGS. 1 and 2 in that the front of the machine may face toward the left rather than the right. In other words, as shown in FIGS. 15 and 16 the power cord 16 is located on the right (rear) of the machine near the switch 18, and the manual control levers 19 (only one is seen, but usually two are included) are located on the left (front) of the machine. Among the advantages of arranging the machine as shown in FIGS. 15 and 16 are that the user can have an unobstructed view down through the transparent cover 16 into the bowl, the bowl handle 23 is conveniently located toward the front, and the latching lever 110, which is toward the rear is conveniently gripped and squeezed by the fingers when the user grasps the outer sleeve 46 for removing it from the feedtube for reloading the feedtube.

As shown in FIGS. 15, 16 and 17, an actuator housing 104 is mounted on the cover 36. This housing 104 overlies the slotted cap 96 protecting the top 105 of the control rod 28 in the boss 26, when the cover 36 is secured in its operating position on the bowl. The actuator housing 104 has a top wall 106 thereon carrying an elevated projection 140 extending upwardly from the top wall 106. This elevated projection 140 has a downwardly and inwardly sloping cam surface 146 facing the feedtube 40. The actuator housing 104 has a top opening 108 therein which is adapted to receive the latching leg 110 and an actuator leg 116 extending downwardly from the outer sleeve 46 of the feedtube protector 44.

As will best be seen in FIGS. 17 and 18, the latching leg 110 and the actuator leg 116 are integrally joined with the outer sleeve 46, being joined thereto by an angled bracket 150 which extends outwardly and slopes down away from the outer sleeve 46. This bracket mounting 150 normally provides a substantially parallel orientation of the two legs 110 and 116 with respect to the outer sleeve 46 and also with respect to the feedtube 40 when the latching leg 110 and the actuator leg 116 respectively, are in an inactivated position on the outer sleeve, as seen in FIG. 18. These two legs 110 and 116 are separated by a vertical slit or channel 152 so that they extend independently from the angled bracket 150 and may be independently flexed toward or away from the feedtube 40 and the outer sleeve 46 in a manner to be described.

The latching leg 110 is relatively wide as seen in FIG. 17 and has a plurality of vertically extending gripenhancing ridges 158 thereon to accommodate gripping with the fingers when the user is grasping the whole outer sleeve 46 to remove it from the feedtube 40 for inserting more food items into the feedtube. The user's grip on the latching leg 110 will flex this leg inwardly toward the feedtube 40, and also inwardly toward the outer sleeve 46, thereby unlatching this leg 110 for permitting removal of the outer sleeve 46 from the feedtube to open it for loading. The latching leg 110 has an extension 160 on its lower end carrying a foot 112 with a cam surface 114 thereon as will best be seen in FIG. 19. The actuator leg 116 has an angled foot 118 having a sole 119 and a toe 162.

As will best be seen in FIG. 18, the cover 36 carries an integral ledge 170 having an outer cam surface 172 which is enclosed by the actuator housing 104 and underlies the top opening 108 in the actuator housing. This downwardly outwardly sloping cam surface 172 performs an outwardly camming function somewhat like camming action of the rounded rim surface 129 (FIG. 12) on the cover 36, as shown by the arrow 130 in FIG. 12. The actuator housing 104 also contains a pivoted arm member 120 mounted on a fixed pivot 126 within the housing 104 secured to the rim of the cover 36. Pivoted arm member 120, as best seen in FIG. 22, has a top shelf 122 terminating in a curved upstanding resilient spring arm 180. This spring arm 180 includes a curved elbow section 182, which fits around the fixed pivot 126 in the housing 104. The upstanding end 183 of this spring arm 180 is captured in a socket 181 (FIG. 21) in the upper corner of the actuator housing 181. Thus, this spring arm 180 acts similarly to the spring 136 (FIG. 14) in normally holding the pivoted arm 120 in an elevated position as seen in FIG. 17. The resilient curved spring elbow 182 where is curves around the fixed pivot pin 126 acts as a resilient pivot for allowing the arm 120 to be depressed, as seen by comparing the elevated and depressed positions of this arm 120 in FIGS. 17 and 21, respectively.

The pivoted arm member 120 has a blade 124 extending downwardly from the shelf 122. This blade 124 is partially separated from the top shelf 122 by a generally horizontal slit 186 to provide the pivoted arm member 120 with resiliency between the shelf 122 and the elbow 182 of the spring arm 180. The downwardly extending blade 124 is terminated in an offset bullet shaped bottom cam 188 which adds width to the blade 124 offset on one side on the bottom thereof. The wide cam 188 extending from the blade 124 provides an increase in the bottom area of the contact surface of the cam 188.

The restricted thickness of the blade 124 intermediate the top shelf 122 and the offset wide bottom cam 188 creates a keyhole-shaped configuration as shown by the arrow 189. (FIG. 22). This keyhold configuration allows the pivoted arm member 120 to enter endwise into the slotted cap 96 when the cover 36 is being twist-locked into operating position on the bowl 22. Many of such caps 96 currently in existence on working bowls 22 in the hands of users today have a keyhole-shaped access slot 98 in the cap 96. Thus, advantageously, this cover with the pivoted arm member 120 having a keyhole-shaped cross-sectional configuration as seen in end view at 189 in FIG. 22 can be used as a retrofit cover which will operate very nicely on many of the existing food processor bowls now owned by food processor users.

As is illustrated in FIGS. 17 and 18, the pivoted arm member 120 in its inactivated position has its cam 188 extending through the slot 98 of the slotted cap 96 overlying and in operative alignment with the top 105 of the control rod 28. Accordingly, downward movement by the pivoted arm member 120 caused by contact with the actuating leg 116 will cause the cam 188 to contact and depress the top 105 of the control rod 28 to turn on the switch 18, and accordingly, the drive 14 of the food processor 10 becomes activated so that it is operable by the control buttons on levers 19 (only one of which can be seen in FIG. 16).

FIGS. 18, 19 and 20 illustrate the operating sequence of this embodiment. In FIG. 18 the cover 36 has been turned relative to the bowl 22 into its twist-locked operating position on the bowl. In this manner the cover 36 with its actuator housing 104 has brought the cam 188 into an overlying and aligned relationship with, but not operatively in contact with, the upper end 105 of the operating rod 28.

With a downward movement of the outer sleeve 46, illustrated by the arrow 128 in FIGS. 19 and 20, the toe 162 of the angled foot 118 of the actuator leg 116 is first cammed inwardly by the cam surface 146 on the elevated projection 140, as shown by comparing the positions of the angled foot 118 in FIGS. 18 and 19. This inward camming of the angled foot 118 allows the angled foot to enter into the opening 108 in the top wall 106 of the actuator housing 104 as illustrated in FIG. 19. As the downward motion 128 continues, the foot cam surface 114 of the latching foot 112 of the latching leg 110 is cammed inwardly, as illustrated by the arrow 134 in FIG. 19, as the foot cam surface 114 contacts the edge 132 adjacent to the opening 108 in the top wall 104 of the actuator housing 104.

As the downward motion continues, as illustrated by the arrow 128 in FIG. 20, the foot 112 of the latching leg 110 moves completely through the opening 108. The toe of this foot 112 engages in hooked relationship beneath the top wall 106 of the housing 104, thereby latching this latching leg 110 in the housing 140 and for holding the outer sleeve 46 in its completely lowered position, as is illustrated in FIG. 21. In other words, the toe of the foot 112 is hooked under the top wall 106 near the edge 132 adjacent to the opening 108.

At the same time that the latching leg is being engaged in hooked position in the housing 104 in the manner shown in FIG. 20, the actuator leg 116 has moved down through the housing opening 108 with the sole 119 of its angled foot 118 engaging and being cammed outwardly, as shown by arrow 130, by the cam surface 172 on the ledge 170 of the cover 36. The toe 167 of the foot 118 is thus pushed down into engagement with the top shelf 122 of the pivoted arm member 120 forcing the cam 188 downwardly into engagement with the top 105 of the control rod 28, thereby depressing the control rod 28 for activating the food processor 10. This activated position is illustrated in both FIGS. 20 and 21.

By virtue of the fact that the actuator leg 116, as it moves control rod 28 downwardly, is initially cammed inwardly by the inwardly downwardly sloping cam surface 146 (FIG. 19) and then soon afterward is cammed outwardly again by the outwardly downwardly sloping cam surface 172, this actuator leg 116 ends its downward travel extending vertically straight again, as seen in FIG. 20. Its straight vertical configuration gives this actuator leg 116 maximum stiffness at the end of its downward travel when it is exerting downward force to depress the arm member 120 against the combined upward force of springs 180 and 30 (FIG. 16). Also, the straight vertical actuator leg 116 now rests against the edge 132 of the top wall 106 of the actuator housing 104 so that this edge 132 acts as a guide for guiding and holding the toe 162 of the angled foot 118 centered on the top shelf 122 of the pivoted arm member 120, as seen in FIG. 20. In effect, the actuator leg 116 is guided down by the edge 132 during the final increment of downward travel after the sole 119 of its angled foot 118 slides down past the outward-acting cam 172.

This embodiment of FIGS. 15–22 operates in a fashion similar to the embodiment shown in FIGS. 8–14. Accordingly, to deactivate the food processor 10 all that is required is for the user to grasp the sleeve 46 while pressing inwardly on the attractively ribbed latching leg 110 for unhooking its latching foot 112 from under the edge 132 of the top wall 106 of the housing 104. The considerable width of the latching leg 110 plus the gripping ridges 158 on the latching leg 110 as well as the resiliency provided by the leg itself, due to its being spaced considerably from the outer sleeve 146, enhances the ease in unlatching operation and provides the desired release. The latching leg 110 may conveniently be squeezed using fingers while grasping the outer sleeve 46 in the hand to press inwardly on the ribbed latching leg 110. Then, the feedtube protector 44 is released for lifting off from the feedtube 40. When the outer sleeve 46 is lifted vertically upward, the toe 162 of the angled foot 118 of the actuator leg 116 is removed from engagement with the top shelf 122 for releasing the arm 120 out of operative engagement with the operating rod 28, thereby deactivating the food processor 10, until the feedtube protector 44 is again vertically lowered fully down onto the feedtube.

As is illustrated in FIG. 21, when the actuator leg 110 forces the pivoted arm member 120 and its cam surface 188 to contact and depress operating rod 28, the pivoted arm is pivoted downwardly placing a downward force on the arm 120. This downward force is continually applied as long as the foot 112 of the latching leg 110 remains hooked underneath the top wall 106 of the housing 104. When the latching leg 110 is released by squeezing that leg and lifting the outer sleeve 46 upwardly, the force which was exerted on the shelf 122 is released, and the spring 180 returns the pivoted arm member 120 to its original inactivated position as illustrated in FIG. 17.

In each of the embodiments illustrated in FIGS. 1–7, 8–14, and 15–22, once the cover is properly positioned in operating condition on the bowl of the food processor, a convenient single vertical downward or upward movement of the outer sleeve of the feedtube protector activates or deactivates, respectively, the food processor. This single-motion activation and deactivation facilitates loading of the food processor. The activation and deactivation of the food processor is accomplished in a single motion without dislodging the cover from the bowl. Furthermore, the protective features which have been provided by the feedtube protector in association with the "expanded" feedtube are fully preserved by the present invention. When the protector is operatively positioned, hands or foreign objects cannot be inserted down through the enlarged feedtube. When the protector is conveniently removed for loading the machine, the machine cannot be activated.

Since other changes and modifications varied to fit particular operating requirements and environments will be understood by those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. In a food processor of the type including a housing containing an electric motor drive and control means for rendering said motor drive inoperative unless said control means is actuated, a bowl mountable on said housing for surrounding a rotary tool adapted to be driven by said electric motor drive and a removable cover for said bowl, a feedtube forming a passageway for feeding food items into said bowl with a feedtube protector including outer means positionable in a predetermined position relative to the feedtube carrying a food pusher captured in a telescoping relationship with respect to said outer means so that the pusher can be plunged longitudinally into said passageway for pushing food items toward the rotary tool in said bowl, said control means being actuated for rendering said motor drive operative when and only when said cover is properly positioned on said bowl and said outer means of the feedtube protector is positioned in said predetermined position relative to said feedtube, feedtube protector actuating means comprising:

laterally extendible means operatively associated with said control means and operated by said outer means of said feedtube protector for causing actuation of said control means by a single downward vertical movement of said outer means into said predetermined position and for deactivation of said control means by an upward vertical movement of said outer means, said laterally extendible means including a member pivotally mounted for rotational movement, said member being operatively associated with said control means for transmission of the downward linear motion of said outer means into a rotational movement of said pivoted member thereby actuating said control means, whereby a one-motion, vertical movement of the outer means of the feedtube into and away from said predetermined position relative to the feedtube controls the operation of the food processor, thereby permitting one-motion opening of the feedtube for convenient loading of the food processor.

2. In a food processor the feedtube protector actuating means set forth in claim 1, in which:

said control means includes a control rod mounted on said bowl extending upright and being longitudinally movable with a protective cap having a closed top overlying the upper end of said control rod and with an aperture in the side of said protective cap, said pivotally mounted member is mounted on said outer means and includes a tongue adapted to become effectively extended during rotation of said member for entering said aperture for engaging the upper end of said control rod for depressing said rod for activating the control means.

3. In a food processor the feedtube protector actuating means set forth in claim 2, in which:

said pivotally mounted member is mounted on said outer means for both rotational and translational movement relative to said outer means, said member includes a first element abutting against said closed top of said protective cap during downward motion of said outer means, for stopping downward movement of said member as the user continues to move said outer means downward, said outer means includes a second element affixed thereto, said second element abutting against said member during downward motion of said outer means, and said second element abutting against said member at a distance from said first element for rotating said member for extending said tongue into said aperture for depressing said rod for activating the control means.

4. In a food processor the protector actuating means set forth in claim 3, in which:

said member including said tongue has a hook shape, and said tongue becomes hooked beneath said closed top of said protective cap when said outer means is fully moved down by the user into said predetermined position.

5. In a food processor the feedtube protector actuating means set forth in claim 4, in which:

said member has a detent notch in the underside of said tongue for engaging the upper end of said control rod for retaining said tongue in activating position.

6. In a food processor the feedtube protector actuating means set forth in claim 3, in which:

said member has a detent notch in the underside of said tongue for engaging the upper end of said control rod for retaining said tongue in activating position.

7. In a food processor the feedtube protector actuating means set forth in claim 3, in which:

said pivotally mounted member includes an attached horizontal shaft, a disc secured to said shaft and spaced from said member, said disc being oriented in a vertical plane perpendicular to said shaft, said outer means having a vertical channel slidably receiving said disc, and said outer means having a pair of horizontally spaced parallel vertical guideways straddling said shaft for permitting both rotational and translational movement of said member relative to said outer means while said disc in said channel stabilizes said member by maintaining said shaft horizontal during rotational and translational movement of said member.

8. In a food processor the feedtube protector actuating means set forth in claim 3, having:

spring means operatively associated with said member for rotating said member for withdrawing said tongue from said aperture during upward motion of said outer means for removing said tongue from operative engagement with said control means.

9. In a food processor the feedtube protector actuating means set forth in claim 1, including:

a housing for said pivotally mounted member on said outer means, said member having a horizontal shaft secured thereto, guideway means in said housing having shaft positioned for longitudinal and rotational movement therein.

10. In a food processor the feedtube protector actuating means set forth in claim 9, having:

a post on said outer means extending into said housing; and spring means mounted on said post spring biasing said member away from said control means, whereby said member is out of engagement with said control means when said outer means is elevated from said predetermined position.

11. In a food processor the feedtube protector actuating means set forth in claim 10, having:

detent means on said member for holding said member in operative engagement with said control means when said outer means is placed by the user in said predetermined position.

12. In a food processor the feedtube protector actuating means set forth in claim 1 in which:

said pivotal member is mounted for pivotal movement in a housing on said outer means, said pivotal member has a shelf for engagement with said outer means on the downward movement thereof, and a cam extending downwardly from said shelf adapted to engage said control means on downward pivotal movement of said member in response to the downward movement of said outer means, thereby actuating said control means.

13. In a food processor of the type including a housing containing an electric motor drive and control means for rendering said motor drive inoperative unless said control means is actuated, a bowl mountable on said housing for surrounding a rotary tool adapted to be driven by said electric motor drive and a removable cover for said bowl, a feedtube forming a passageway for feeding food items into said bowl with a feedtube protector including outer means positionable in a predetermined position relative to the feedtube carrying a food pusher captured in a telescoping relationship with respect to said outer means so that the pusher can be plunged longitudinally into said passageway for pushing food items toward the rotary tool in said bowl, said control means being actuated for rendering said motor drive operative when and only when said cover is properly positioned on said bowl and said outer means of the feedtube protector is positioned in said predetermined position relative to said feedtube, feedtube protector actuating means comprising:

a laterally extending member pivotally mounted on the cover, said member becoming positioned above said control means when the cover is properly positioned on the bowl for becoming operatively associated with said control means when the cover is properly positioned, and said outer means including an element attached thereto which engages said pivotal member for swinging said member downwardly during a single downward movement of said outer means into said predetermined position for causing actuation of said control means by a single downward movement of said outer means into said predetermined position and for disengaging from said pivotal member during a single upward movement of said outer means away from said predetermined position for deactuating said control means by a single upward movement of said outer means, whereby a one-motion downward or upward movement of the outer means of the feedtube, respectively, into or away from said predetermined position relative to the feedtube controls the operation of the food processor, thereby permitting one-motion opening of the feedtube for convenient loading of the food processor.

14. In a food processor of the type including a housing containing an electric motor drive and control means for rendering said motor drive inoperative unless said control means is actuated, a bowl mountable on said housing for surrounding a rotary tool adapted to be driven by said electric motor drive and a removable cover for said bowl, a feedtube forming a passageway for feeding food items into said bowl with a feedtube protector including outer means positionable in a predetermined position relative to the feedtube carrying a food pusher captured in a telescoping relationship with respect to said outer means so that the pusher can be plunged longitudinally into said passageway for pushing food items toward the rotary tool in said bowl, said control means being actuated for rendering said motor drive operative when and only when said cover is properly positioned on said bowl and said outer means of the feedtube protector is positioned in said predetermined position relative to said feedtube, feedtube protector actuating means comprising:

an arm member mounted for pivotal movement in a housing on said removable cover, said arm member coming into operative association with said control means when the cover is mounted on the bowl in proper position for operation of the food processor, an actuating leg on said outer means, said actuating leg engaging said arm member during the downward movement of said outward means to said predetermined position for swinging said arm downwardly for actuating said control means by a single downward movement of said outer means into said predetermined position, and said actuating leg disengaging from said arm member during the upward movement of said outer means away from said predetermined position for swinging said arm upwardly for deactuating said control means by a single upward movement of said outer means away from said predetermined position, whereby a one-motion, movement of the outer means of the feedtube into and away from said predetermined position relative to the feedtube controls the operation of the food processor, thereby permitting one-motion opening of the feedtube for convenient loading of the food processor.

15. In a food processor the feedtube protector actuating means set forth in claim 14, having:

a latching leg extending downwardly from said outer means for engaging said housing in latched relation for holding said outer means in said predetermined position for holding said control means in actuated condition until released.

16. In a food processor the feedtube protector actuating means set forth in claim 15 in which:

said actuating and latching legs are mounted on said outer means on a bracket extending outwardly and downwardly therefrom, said legs extending downwardly from said bracket approximately parallel to said outer means in an inactivated position of said outer means.

17. In a food processor the feedtube protector actuating means set forth in claim 16 having a cam surface on said housing for camming said actuating leg into said opening at the top of said housing.

18. In a food processor the feedtube protector actuating means set forth in claim 16 in which:

said pivotal member has said shelf and said cam joined by a narrow blade having a slit therein extending under said shelf from the pivot end of said shelf, said cam being wider than said blade for providing said pivot member generally with a keyhold-shaped cross-sectional configuration and with a wide bottom surface for engaging said control means.

19. In a food processor the feedtube protector actuating means set forth in claim 16, in which:

said latching leg is provided with vertically extending ridges for facilitating gripping for easily releasing the outer means from latched engagement with said housing when said latching leg has been squeezed.

20. In a food processor the feedtube protector actuating means set forth in claim 14 in which said housing, containing said arm member has an opening in the top thereof for receiving said actuating leg on the downward movement of said outer means.

21. A feedtube protector for use in a food processor of the type having an enlarged feedtube forming a food passageway for feeding food items toward a rotary tool in a bowl of the food processor, said feedtube protector comprising:

an outer sleeve positionable in a predetermined position relative to an enlarged feedtube of a food processor, a food pusher captured in telescoping relationship with respect to said outer sleeve which, when said sleeve is in said predetermined position relative to an enlarged feedtube, said food pusher is plungable longitudinally into the food passageway of the feedtube, an actuating leg on said outer sleeve adapted to cause actuation of the food processor when said outer sleeve is in said predetermined position relative to an enlarged feedtube, and a movable manually releasable latching leg on said outer sleeve for holding said actuating leg in an actuated position until released.

22. The feedtube protector set forth in claim 21 wherein:

said latching leg is substantially wider than said actuating leg for facilitating the removal of said feedtube protector from the food processor on which it is employed.

23. In a food processor having a bowl cover with a feedtube defining a passageway of relatively large cross-sectional area and having control means for rendering the motor drive of the food processor inoperative unless said control means is activated by a member entering into an access opening near said control means and activating said control means, feedtube protector apparatus adapted to be placed into a predetermined position relative to the feedtube for protecting said large passageway from inadvertent entry, said feedtube protector apparatus comprising:

a member movably mounted on the cover, said member being movable between first and second positions and said member normally remaining in said first position, said member entering said access opening near said control means when the cover is mounted in proper position on the bowl, outer means having an actuator element mounted thereon which moves said member into said second position for activating the control means when said outer means is placed into a predetermined position relative to the feedtube, and said member returning to said first position for deactivating the control means when said outer means is removed from said predetermined position.

24. In a food processor, feedtube protector apparatus as claimed in claim 23, in which:

releasable latching means is mounted on the outer means and includes a latching portion, and the cover includes a surface portion mounted thereon adapted to be engaged by said latching portion when the outer means is placed in said predetermined position.

25. In a food processor, feedtube protector apparatus as claimed in claim 24, in which:

said releasable latching means is a latching leg mounted on the outer means and extending downwardly, said latching leg has a foot on the lower end, the cover includes a horizontal surface portion mounted thereon beneath which said foot becomes hooked when the outer means is moved into said predetermined position, and said latching leg is manually movable for releasing the foot from being hooked for releasing the outer means to be removed from said predetermined position.

26. In a food processor, feedtube protector apparatus as claimed in claim 25, in which:

said member is movably mounted on the cover and is located within a housing having an open top wall, said actuator element is an actuator leg mounted on said outer means and extending downwardly, said actuator element enters through said open top wall for depressing said movable member when the outer means is moved down into said predetermined position, a latching leg mounted on the outer means and extending downwardly near said actuator leg, said latching leg having a foot on the lower end, said foot becomes hooked beneath said top wall when the outer means is moved down into said predetermined position, and said latching leg is manually movable for releasing the foot from being hooked beneath said top wall for releasing the outer means to be lifted from said predetermined position for exposing the feed passageway for inserting food items therein.

27. In a food processor, feedtube protector apparatus as claimed in claim 26, in which:

both said actuator leg and said latching leg are resiliently movable, said housing has first cam means associated therewith for camming said actuator leg for bringing said actuator leg into contact with said movable member for depressing said member as the outer means is moved down into said predetermined position, and said housing has second cam means associated therewith for camming said latching leg for causing said foot to become hooked beneath said top wall when the outer means is moved down into said predetermined position.

28. In a food processor of the type including a housing containing an electric motor drive and control means for rendering said drive inoperative unless said control means is activated, a bowl mountable on said housing for surrounding a rotary tool adapted to be driven by said drive and a removable cover for said bowl, a feedtube forming a passageway for feeding food items into said bowl with a feedtube protector including outer means positionable in a predetermined position relative to the feedtube, said outer means carrying a captured food pusher so that the pusher can be plunged longitudinally in said passageway for pushing food items toward the rotary tool in said bowl when said outer means is in said predetermined position relative to the feedtube, said control means being activated for rendering said motor drive operative when and only when said cover is mounted in proper position on said bowl and said outer means of the feedtube protector is positioned in said predetermined position relative to the feedtube, feedtube protector actuating means comprising:

a pivotal member swingable between first and second positions, said pivotal member normally being in said first position, said pivotal member being operatively associated with said control means when the cover is mounted, and said pivotal member being swung from said first into said second position by said outer means of said feedtube protector for causing actuation of said control means by a completion of the downward movement of to said predetermined position, said pivotal member being swung back from said second into said first position for deactivation of said control means during upward movement of said outer means, whereby a one-motion movement of the outer means of the feedtube protector into and away from said predetermined position relative to the feedtube controls the operation of the food processor, thereby permitting one-motion opening of the feedtube for convenient loading of the food processor.

29. In a food processor, the feedtube protector actuating means set forth in claim 28, in which:

said control means includes a control rod mounted for longitudinal movement along the side of said bowl, said bowl having a protective cap with a closed top covering the upper end of said control rod, said protective cap having an aperture on its side, said pivotal member being mounted on said outer means for translational and swinging movement relative to said outer means, said pivotal member including a tongue operatively associated with said protective cap and said operating rod such that during the downward movement of said outer means said pivital tongue into said aperture in said cap for engaging the upper end of said rod for depressing said rod, thereby activating said control means.

30. In a food processor the feedtube protector actuating means set forth in claim 29, having:

spring means operatively associated with said pivotal member for normally urging the tongue of said member away from said protective cap, and the downward movement of said outer means overcoming said spring means for producing said translational and swinging movement of said pivotal member for moving said tongue into said aperture into engagement with said upper end during the downward movement of said outer means of the feedtube protector.

31. In a food processor, the feedtube protector actuating means set forth in claim 28, in which:
said pivotal member is mounted on said outer means for translational and swing movement relative to said outer means,
said pivotal member abuts against a portion of the bowl during downward movement of said outer means for stopping downward movement of said member while the user continues to move said outer means downwardly for causing said member to translate relative to the downwardly moving outer means, and
said outer means includes an element fixed thereto,
said element abuts against a portion of said pivotal member while said pivotal member is abutting said portion of the bowl for swinging said member from said first to said second position.

32. In a food processor, the feedtube protector actuating set forth in claim 31, in which:
said bowl has a protective cap mounted thereon with a closed top position above said control means,
said protective cap having an aperture in its side, and
said pivotal member enters said aperture for activating said control means when said member swings into said second position.

33. In a food processor the feedtube protector actuating means set forth in claim 28, having:
a housing on the bowl with an opening therein,
said housing carrying said pivotal member, and
an actuating leg on said outer means adapted to move downward through said opening in said housing to engage said pivotal member and swing said member from said first to said second potision.
a latching leg extending downwardly from said outer means adapted to move through said opening in said housing and to engage said housing in latched relation for holding said outer sleeve in said predetermined position relative to said feedtube for holding said control means in an activated position until released.

34. In a food processor the feedtube protector actuating means set forth in claim 33 in which:
said pivotal member has a shelf for engagement with said actuating leg,
there is a cam on the bottom of said pivoted member, and
said cam is joined by a narrow blade having a slit therein extending under said shelf from the pivot end of said shelf, said cam being thicker than said blade for providing said pivot member with a wide cam for engaging said control means, and said slit providing spring-like resiliency.

35. In a food processor the feedtube protector actuating means set forth in claim 34, in which:
said narrow blade and bottom cam of said pivotal member has generally a key-hole shaped configuration as seen in end view.

36. In a food processor the feedtube protector actuating means set forth in claim 33, having:
a latching leg extending downwardly from said outer means adapted to move through said opening in said housing and to engage said housing in latched relation for holding said outer sleeve in said predetermined position relative to said feedtube for holding said control means in an activated position until released.

37. In a food processor the feedtube protector actuating means set forth in claim 36 in which:
said actuating and latching legs are mounted on said outer means on a bracket extending outwardly and downwardly therefrom, said legs extending downwardly from said bracket approximately parallel to said outer means in an inactivated position of said outer means.

38. In a food processor the feedtube protector actuating means set forth in claim 37 having a cam surface on said housing for camming said actuating leg into said opening at the top of said housing.

39. In a food processor the feedtube protector actuating means set forth in claim 36 in which:
said latching leg is provided with vertically extending ridges for facilitating gripping by the user to easily release the outer means from said housing.

40. In a food processor having a feedtube with a passageway of relatively large cross-sectional area and having control means for rendering the motor drive of the food processor inoperative unless said control means is activated by horizontal movement of an element through an opening into contact with said control means, feedtube protector apparatus including said element, said feedtube protector apparatus being adapted to be placed vertically downward, into a predetermined position relative to the feedtube for protecting said large passageway from inadvertent entry of the user's hand, said feedtube protector apparatus comprising:
a rotatable member operatively associated with said element,
means for rotating said member in response to vertical downward movement of said feedtube protector apparatus into said predetermined position relative to the feedtube for producing a horizontal component of motion, and
said element becoming extended by said horizontal component of motion through said opening into contact with said control means for rendering the motor drive operative.

41. In a food processor, feedtube protector apparatus as claimed in claim 40, in which:
said rotatable member is mounted in a housing in said apparatus for simultaneous rotational and translational movement relative to said housing, and
said means rotates and translates said member relative to said housing in response to vertical downward movement of said feedtube protector apparatus into said predetermined position relative to the feedtube.

* * * * *